United States Patent Office 3,094,531
Patented June 18, 1963

---

3,094,531
CAFFEINO-8-ALKANOLAMINES
Josef Klosa, Berlin-Zehlendorf, Germany, assignor to Delmar Chemicals Limited, Lachine, Quebec, Canada, a corporation of Canada
No Drawing. Filed Apr. 30, 1959, Ser. No. 809,919
5 Claims. (Cl. 260—256)

The present invention relates to novel compounds in the form of caffeino-8-alkanolamines of the following formula:

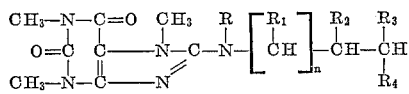

and the non-toxic pharmacologically acceptable addition salts thereof, in which formula R=H or phenyl or $CH_3$
$R_1$=H
$R_2$=H
$R_3$=H, OH or $OCH_3$
$R_4$=H
$n$=0 or 1

These new compounds may be prepared from 8-halogenocaffeine and alkanolamines. The two components may be reacted in the absence of a solvent by heating (for 80–100 minutes) to 140–180° C. or they may be reacted in a suitable solvent, such as toluol or xylol. They may be reacted with each other also in alcohols in the presence of catalysts, such as potassium bromide or iodide, by refluxing for several hours. The "melt process," that is the heating of the mixture of the two components, is the preferred process.

It is known that while caffeine has a stimulating activity in cases of fatigue, it also has undesirable side-reactions involving the heart and circulation. Many efforts have been made to modify caffeine and other suitable xanthine derivatives so as to retain the stimulating activity and yet eliminate the influence on the heart and circulation. So far these efforts have not been successful. This being so, it is surprising, and it was not possible to foresee, that members of the class of compounds forming the subject of this invention possess a stimulating activity surpassing that of caffeine, while they are nevertheless less toxic. A further advantage of this group of compounds is that some of them (for example, the N-gamma-[caffeino-(8)]-aminopropanol-(2)) are soluble in water.

Compared with caffeine the toxicity of some-representatives of these compounds is as follows:

| Name | LD$_{50}$-subcutan in mg./kg. | Code No. | Described in Example No. |
|---|---|---|---|
| Caffeine | 320 | | |
| beta-[caffeino-(8)]-beta-methylamino-ethanol | 700 | G-1 | 2 |
| 1-phenyl-2-[caffeino-(8)]-aminopropanol-(1) | 650 | G-4 | 4 |
| N-beta-[caffeino-(8)]-aminoethanol | 1,800 | G-5 | 1 |
| N-gamma-[caffeino-(8)]-aminopropanol-(1) | 1,900 | G-90 | 5 |
| N-gamma-[caffeino-(8)]-aminopropanol-(2) | 1,800 | G-90a | 6 |

The determination of the toxicity was carried out according to the method of Kaerber (Arch. f. exper. Pathol. und Pharmakol. 162,480 (1931)). White male mice of 18–20 gms. were used.

The central-nervous-system (CNS) stimulating activity can be best demonstrated in a "spinning wheel" experiment (Chemnitius: Wissenschaftl. Zeitschrift der Friedrich-Schiller-Universitat, Jena, 6,207 (1956/7)). For each compound 6 animals and 6 control animals were used. The number of the rotations of the wheel were checked every 10 minutes for a period of 2 hours and the average rotation within the same period of time determined. The following table contains the results:

| Compound | Difference of accomplishment compared with control animals | Statistical Reliability, percent | Order of Activity in 10 min. intervals |
|---|---|---|---|
| Caffeine | No change | | |
| G-1 | Increased | 95.45 | 3 |
| G-4 | Little change | | |
| G-5 | Increased | 95.45 | 8 |
| G-90 | Greatly Increased | 98.23 | 9 |
| G-90a | do | 97.56 | 8 |

According to this experiment caffeine has no CNS stimulating activity. It has no such activity according to the "Zitterkaefig" experiment either. (K. Irrgang: Fortschr. Therap. 18,145 (1942); Fr. E. Koch, 2 exper. Med. 106, 445 (1939); A. W. Forst, Arch. exper. Pathol. und Pharmakol. 189, 288 (1938)). In contrast, the compounds of this invention show an unmistakable CNS stimulating activity which can be demonstrated according to known pharmacological tests.

In determinations of the effect on blood pressure in the cat, the depressing action of caffeine was up to 10 times greater than that of the compounds of this invention. The diuretic activity of caffeine is also quite marked, while members of this class of compounds have no diuretic activity. It seems that the compounds of this invention have a surprisingly specific CNS stimulating activity with a much reduced effect on the circulation when compared with caffeine.

Caffeine derivatives with substituents in the 8 position have been described previously (German Patent 938,310; see also J. Ehrhardt, Arch. Pharmaz. Ber. Dtsch. Parmaz. Ges., vol. 290, p. 16 (1957)). These compounds have a sedative action. It is also known that relatively simple derivatives of caffeine, such as 8-ethoxy- or 8-methoxy-caffeine, possess a narcotic activity (Pfluegers Arch., vol. 160, pp. 205, 207, 283 (1915)). All such previously known compounds are much more toxic than the compounds of this invention and they have no therapeutically useful CNS stimulating activity.

The new compounds of this invention shall be used as therapeutics, and intermediates in the preparation of therapeutics.

Example 1

N-beta-[caffeino-(8)]-aminoethanol (R=H; $R_2$=H; $R_3$=OH; $R_4$=H; $n$=0)

22 gms. 8-chlorocaffeine and 12 gms. beta-aminoethanol are heated under reflux one hour at 130–140° C. The 8-chlorocaffeine goes in solution, producing first a purplish and then a yellow-brown color. After an hour's heating, 50–70 ml. alcohol of 96% are added, the mixture heated again to reflux, filtered hot and let stand to crystallize. The M.P. of the nice white, crude crystals is 236–8° C. Recrystallized from a little hot water, the M.P. is 239–41° C. Yield: 19 gms. Solubility in cold water, about 1%, the pH of the solution is 7.0.

Example 2

Beta-N-methyl-beta-[caffeino-(8)]-aminoethanol (R=$CH_3$; $R_2$=H; $R_3$=OH; $R_4$=H; $n$=0)

21 gms. 8-chlorocaffeine and 15 gms. beta-N-methyl-aminoethanol are heated to 140–160° C. for 30 minutes. Then the temperature is increased for 15–20 minutes to 165–170° C. On cooling a colorless mass of crystals results. This is boiled with 50–60 ml. ethanol and crystallized. Colorless crystals result which are soluble in water up to about 6%; pH of the aqueous solution is 6.9. The yield is 19 gms. while the M.P. is 162–64° C.

Example 3

Beta-N-phenyl-beta-N-[caffeino-(8)]-aminoethanol
($R=C_6H_5$; $R_2=H$; $R_3=OH$; $R_4=H$; $n=0$)

22 gms. chlorocaffeine and 26 gms. beta-N-phenyl-aminoethanol are refluxed for 15–20 hours in 100 ml. n-butanol or n-propanol in the presence of 0.5 gms. potassium bromide. The alcohol is removed in vacuo and the residue taken up in hot water. After standing for 3 hours, the crystals are filtered off and are recrystallized from alcohol or toluol. M.P. is 177–178° C. The crystals are soluble in warm water up to about 0.5%. Aqueous solutions, as well as crystals discolor to pink on standing. The pH of the aqueous solution is 7.2.

Example 4

Gamma-N-[caffeino-(8)]-amino-propanol-(3).  ($R=H$; $R_1=H$; $R_2=H$; $R_3=OH$; $R_4=H$; $n=1$)

44 gms. 8-chlorocaffeine are heated under reflux to 140–150° C. with 40 gms. 3-aminopropanol-(1). The temperature should not be allowed to rise over 180° C. The taking place of the reaction at 140–160° C. is indicated by a rise in temperature and taking a surplus of 3-aminopropanol-(1) is advisable to moderate the rise. After 1–2 hours of heating the viscous product (which may crystallize on cooling) is boiled with 100 cc. alcohol, filtered hot and allowed to crystallize. Yield of the crude product is about 43 gms. The white, somewhat gummy and yellowish crystals (M.P. 218–220° C.) are recrystallized from 200 ml. hot water, resulting in white, silky, long needles. M.P. 224–226° C. Yield, about 40 gms. Soluble in water up to 2%. pH of solution is 7.0.

Alternately the compound may be prepared by refluxing for two hours in toluol.

Example 5

N-gamma-[caffeino-(8)]-aminopropanol-(2).  ($R=H$; $R_1=H$; $R_2=OH$; $R_3$ and $R_4=H$; $n=1$)

22 gms. 8-chlorocaffeine and 30 gms. 3-aminopropanol-(2) are reacted as in Example 4. Yield, 17 gms. M.P. 221–222°, recrystallized from the alcohol. Well soluble in alcohol and water (pH 7.1), insoluble in ether and petroleum ether.

In addition to the bases described above pharmaceutically acceptable acid addition salts of such bases may be easily prepared by conventional means by acid-base neutralizations, metathesis and other known means. Such salts approximate the bases in pharmaceutical effect. Since the nitrogen group attached to the cyclical 8-carbon is essentially a secondary amine it forms the active site for the attachment of the addition radicals. Among the salts which may be so formed are the hydrochloride, the hydroiodide, the sulfate, the phosphate, the nitrate, the acetate, the benzoate, the salicylate, the glycolate, the succinate, the nicotinate, the tartrate, the maleate, the malate, the lactate, and the like.

The above enumeration is made without restriction. The pharmacologically acceptable acids would all appear to form effective compounds.

The compounds of the present invention are active as mild CNS stimulants providing an activity somewhat superior to that of caffeine but without the undesirable cardiovascular effects of caffeine. They may be incorporated in conventional dosage forms, the crystals and powder being first granulated with a carrier such as lactose and then compressed into tablets, while the oil forms may be easily placed in and administered in capsules. The compounds may also be made into liquid pharmaceutical specialties in the form of solutions, suspensions, elixirs and the like. Convenient tablet unit dosages incorporate 20 mg. of base or base equivalent per tablet and have been administered generally three times per day.

Although the present invention has been described with a certain degree of particularity, it is understood that the present disclosure has been made only by way of example and that numerous variations may be employed without transcending the scope of the invention as hereinafter claimed.

What is claimed is:
1. N-gamma-[caffeino-(8)]-aminopropanol-(1).
2. N-gamma-[caffeino-(8)]-aminopropanol-(2).
3. N-beta-[caffeino-(8)]-aminoethanol.
4. 1-phenyl-2-[caffeino-(8)]-aminopropanol-(1).
5. Beta-[caffeino-(8)]-beta-methylamino-ethanol.

References Cited in the file of this patent

UNITED STATES PATENTS

| | | |
|---|---|---|
| 2,575,344 | Jones et al. | Nov. 20, 1951 |
| 2,739,921 | Bennett | Mar. 27, 1956 |
| 2,799,675 | Ehrhart et al. | July 16, 1957 |
| 2,879,271 | Kallischnigg | Mar. 24, 1959 |

OTHER REFERENCES

Blicke et al.: Jour. Amer. Chem. Soc., volume 76, page 2835 (1954).

British Med. Journal, pages 938–939, April 19, 1958.

Laurence et al.: British Med. Journal, pages 700–702 (1958).

Goodwin et al.: The Pharmaceutical Journal, volume 181:4952, pages 233–235, September 1958.

Keele: The Lancet, pages 243–246. January 31, 1959.